__United States Patent Office__  3,355,855
Patented Dec. 5, 1967

3,355,855
CONTROL MANIPULATING ARM EMBODIED IN A PACKAGE HANDLING MACHINE
Winton Loveland, Freeport, and Saul Warshaw, New York, N.Y., assignors to The Loveshaw Corporation, Farmingdale, N.Y., a corporation of New York
Filed Aug. 6, 1965, Ser. No. 477,868
4 Claims. (Cl. 53—75)

The present invention relates to package handling machines, such as carton closing machines, and, more specifically to trip means or arms for actuating control units thereof in response to contact by a package unit or carton transported through the machine. The present application is a continuation-in-part of our copending application for Automatic Carton Closing Machine, Ser. No. 219,212, filed Aug. 24, 1962.

A general object of the present invention is to provide a package handling machine such as control trip means in the form of a manipulating arm so located with respect to a path of travel of a package unit through the machine and of a shape as to assure operation thereof by the passing package unit in a manner to avoid effectively undesirable "chatter" operation of the control means manipulated thereby.

A more specific object of the invention is to provide a package handling machine with control means equipped with such a manipulating arm that is provided with an oblique camming nose or terminal end section which assures that as the corner defining the back end of the opposed package sidewall is transported forward past this arm its oblique terminal end section will wipe progressively across this package corner with gradual swing outward of the arm in behind the package to the arm's initial rest position without causing a jarring stop of the arm that may cause bouncing action of the control mechanism and attendant cycling operation of the latter.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
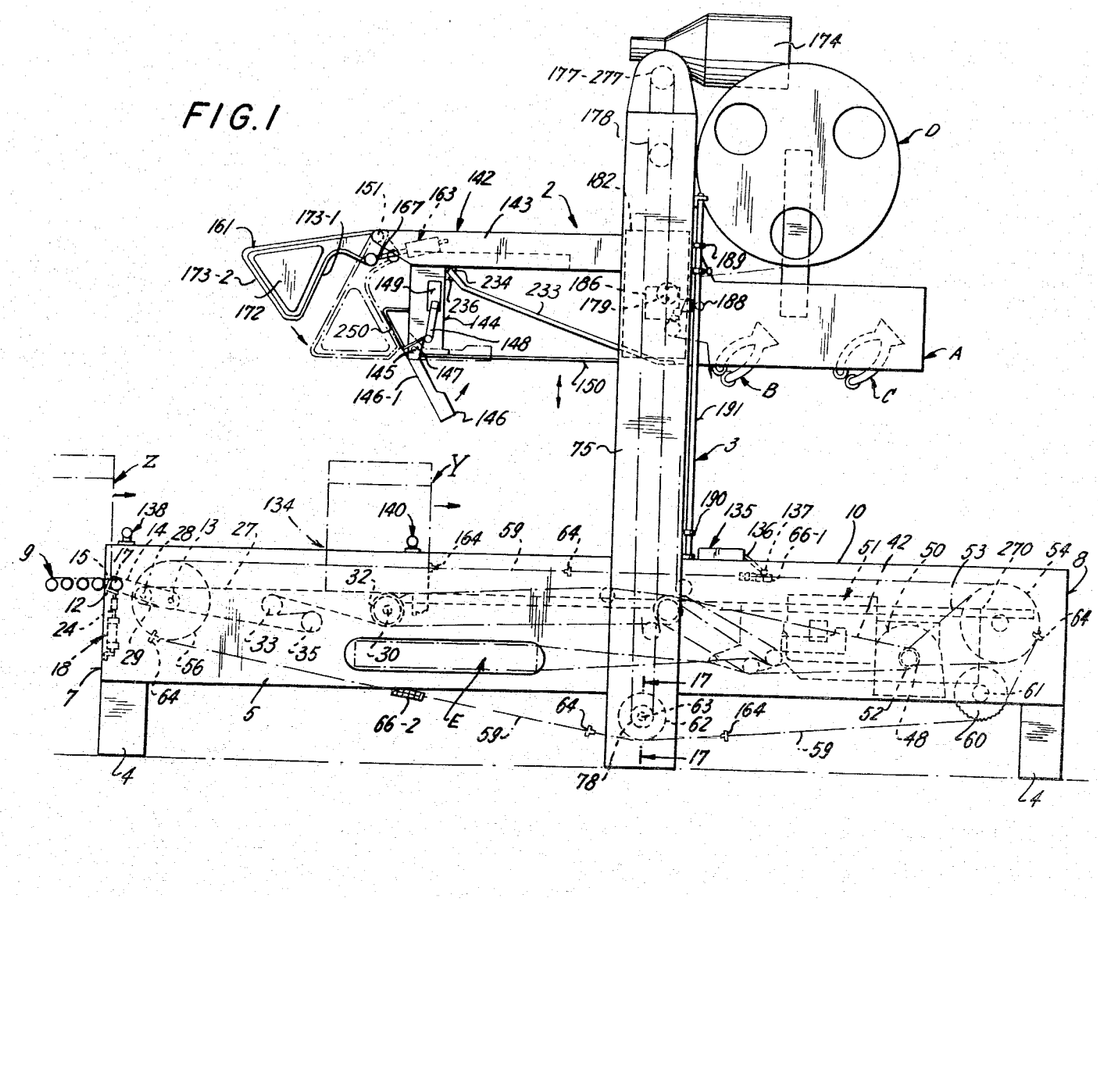
FIG. 1 is a side elevational view to reduced scale, with parts omitted for clarity, of a type of automatic carton closing machine which embodies forms of control means equipped with manipulating arms of the present invention.
Figure 2:
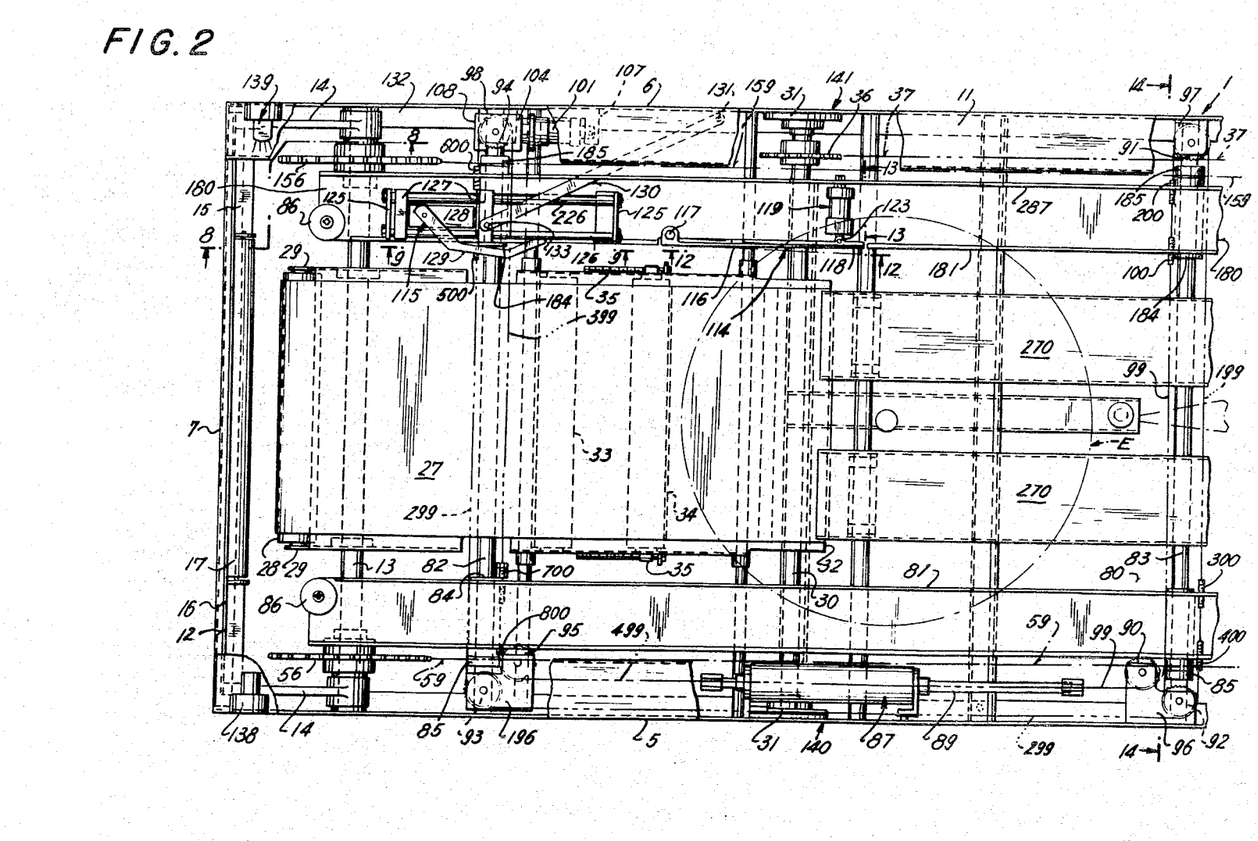
FIG. 2 is a top plan view to larger scale, with parts broken away, of the entrance end of the bed unit of the machine shown in FIG. 1, and illustrating a control switch having such a manipulating arm.
Figure 3:
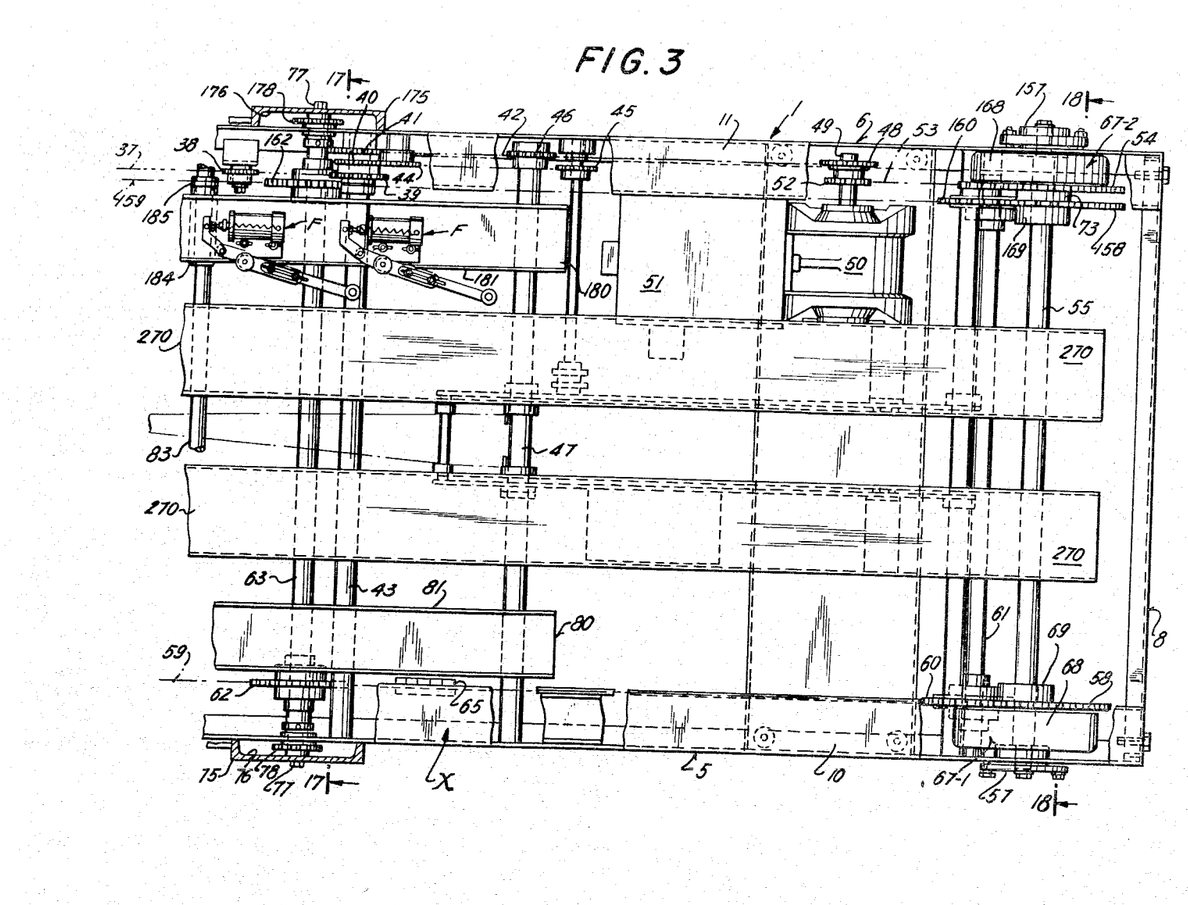
FIG. 3 is a view similar to FIG. 2, with parts in section, of the remaining discharge end of the bed of the machine, also embodying another type of control means which may be equipped with another form of such manipulating arm.

Referring to the drawings, in which like numerals identify similar parts throughout, it will be seen, and particularly from FIGS. 1, 2 and 3, that the embodiment of the automatic carton closing machine illustrated by way of example therein may comprise a bed unit 1 and an elevating head unit 2 supported on the former by upwardly-extending standards or columnar structure 3. Conventionally the parts of the machine are made of suitable metals. The bed unit 1 has a rectangular frame structure supported upon suitable legs 4. The frame structure may include opposed sidewalls 5 and 6, a relatively low end wall 7 at the entrance end, and another end wall 8 at the discharge end.

The bed unit 1 is equipped with lateral conveyor means suitably supported by the frame sidewalls 5 and 6, and this conveyor means has an entrance end in the vicinity of end wall 7 and a discharge end in the vicinity of end wall 8. This conveyor means defines a longitudinal path of forward carton travel along which it successively transports a plurality of open-top cartons. Such cartons are of conventional form being constructed, if desired, from corrugated board and rectangular in cross section with the edges of the top thereof provided with upwardly-extending front and back flaps respectively on the leading and trailing top edges and opposed upwardly-extending side flaps on the side top edges, all to be folded down to closed lateral lapping positions for securement in carton closing positions. The machine of the present invention is designed automatically to close successively the tops of such cartons in this manner after they have been loaded with the products to be marketed or shipped therein. Accordingly, any suitable feeding means, such as a roller conveyor 9, illustrated in FIG. 1, will be mounted adjacent the entrance end of the bed unit 1, i.e., adjacent the end wall 7, successively to feed a supply of the loaded cartons over the top edge of the latter to the conveyor means. The frame structure of the bed unit 1 may include lateral sheet metal ledges 10 and 11 extending inwardly from the top edges of the sidewalls 5 and 6 for support of certain control devices as will appear hereinafter, and strengthening cross framing members may be embodied.

At the entrance end of the bed unit 1, in the vicinity of end wall 7, is mounted a liftable gate 12 shown in FIGS. 1 and 2. A cross shaft 13, having its ends supported by sidewalls 5 and 6 of the frame structure, pivotally supports a pair of swinging arms 14 which carry on their back ends a gate bar 15. The gate bar 15 may be in the form of a length of angle stock having an upwardly-extending, carton-barring flange 16. The gate bar 15 preferably supports thereon a rotatable roll 17 over which the bottom of a loaded carton may advance readily after a leading portion advances thereover. It will be understood that when the gate arms 14 are swung upwardly, or in a clockwise direction as viewed in FIG. 1, the gate flange 16 will swing up above the plane defined by the tops of the series of feed rollers 9 to bar the leading end of a carton bottom supplied across the latter until this gate flange is lowered below this feed plane.

The conveyor means includes a continuously driven, initial endless section 27 indicated in FIG. 1 and seen in FIG. 2. For this purpose, an idling roller 28 is rotatably supported by a pair of arms 29 pivotally mounted on the cross shaft 13. A driving shaft 30 is rotatably supported by bearing units 31 between the frame sidewalls 5 and 6, and carries fixed thereto a driving roller 32. The initial conveyor section 27 preferably is in the form of an endless belt lapped about the rollers 28 and 32. As will be best seen from FIG. 1, a bottom run of the conveyor belt 27 is lapped back and forth about idling rolls 33 and 34 with the latter supported by tension adjusting devices 35. The shaft 30 carries a sprocket 36 fixed thereto to be driven by a drive chain indicated by dot-dot-dot-dash lines 37 in FIGS. 2 and 3. The endless driving chain 37 has a run lapped against a guiding idler 38 and is lapped about a driving sprocket 39. Driving sprocket 39 is one of a group of three thereof fixed together with the second 40 constituting means for driving tape feeding mechanism and the third 41 constituting the driving sprocket about which is lapped a driving chain indicated by dot-dot-dash lines at 42 in FIG. 3. The group of sprockets 39, 40 and 41 are rotatably supported by a cross shaft 43 and the tape feed sprocket drives tape feeding mechanism comprising sprockets 44 and 45 about which an endless chain is lapped and a sprocket 46 against which the drive chain 42 is lapped in turn to drive a cross shaft 47 of tape feed mechanism. The endless chain 42 is lapped about a driving sprocket 48 fixed to a driving stub shaft 49 of a reduction gear unit 50 operated by a main driving electric motor 51. The driving stub shaft 49 also carries fixed thereto another driving sprocket 52 about which is lapped an endless driving chain indicated by dot-dash lines at 53 in FIG. 3, in turn lapped about a driven sprocket 54 rotatably supported by a cross shaft 55 equipped with suitable brake and clutch devices for drive of a second conveyor section as is explained hereinafter.

Cross shaft 13 also carries, rotatably supported thereon, a pair of near and far idler sprockets 56 and 156, as will be seen in FIG. 2, while cross shaft 55 is rotatably supported by bearing units 57 and 157 carried by frame sidewalls 5 and 6. Drive shaft 55 carries fixed thereto a pair of near and far sprockets 58 and 158 respectively aligned with sprockets 56 and 156. The second endless conveyor section preferably is in the form of a pair of endless chains, indicated by dot-dash lines 59 and 159 in FIGS. 2 and 3, respectively lapped about sprockets 56 and 58, and 156 and 158, for drive by sprockets 58 and 158. As will be best understood from FIG. 1, the lower run of each of the endless chains 59 and 159 is lapped beneath one of a pair of idlers 60 and 160 rotatably supported by a cross shaft 61 mounted between frame sidewalls 5 and 6, and beneath another of a pair of idlers 62 and 162 rotatably supported by another cross shaft 63. The second endless conveyor section also includes a series of carton transporting flight bars 64 which, as is indicated in FIG. 1, may be four in number spaced longitudinally appreciably apart. The pair of conveyor chains 59 and 159 also carry a plurality of reversed flight bars 164 which may be similar to the flight bars 64. There may be a pair of the reversed flight bars 164, and each constitutes a carton stop having the function of holding a carton at a sensing station when the second conveyor section pauses or is held in stop position. The endless conveyor chain 59 on the near side, as viewed in FIG. 1, also is equipped with a plurality of tripping lugs 66–1 and 66–2 to be carried along therewith for operating certain limit conveyor means, and there may be a pair thereof each associated with one of the carton stop flight bars 164.

It will thus be seen that the initial conveyor section comprising endless belt 27 has an entrance end near the vicinity of the selector gate 12 and a discharge end at a point appreciably in advance thereof which is at a carton sensing and flap folding station. From the discharge end of the initial conveyor section or belt 27 suitable fixed carton-supporting structure extends forward, and this may be in the form of a pair of fixed rails 270 suitably supported between the frame sidewalls 5 and 6 and terminating in the vicinity of the discharge end wall 8, as will be seen from FIGS. 2 and 3. It will also be understood therefrom that the second conveyor section comprising conveyor chains 59 and 159 and their flights 64 extend forward at least from the discharge end of the belt conveyor 27 to the discharge end of the bed unit 1. As will be apparent from FIG. 2, preferably the entrance end of the chain conveyor appreciably laps the discharge end of the belt conveyor and, in fact, has its chain-supporting front sprockets 56 and 156 rotatably supported on the same cross shaft 13 which pivotally carries the arms 29 rotatably supporting roller 28 about which the entrance end of the conveyor belt 27 is lapped. Thus, any carton which is delivered to the sensing and flap folding station by the conveyor belt 27 will be picked up there by an oncoming flight 64 of the chain conveyor to be slid forward over the rails 270 to the discharge end of the bed unit 1.

The near end of driven cross shaft 55 carries a housed magnetic brake 67–1 and the far end thereof carries a housed magnetic clutch 67–2, both of which may be of conventional construction. For example, the frame sidewall 5 may fixedly support through fixed housing 68 of the brake unit 67–1 fixed field coils and core structure thereof opposed to an axially slidable armature therein. Hub 69 of drive sprocket 58 is keyed to the drive shaft 55 and the sprocket in turn carries circumferentially-spaced, axially-extending pins 70 on which is slidably mounted for axial motion the armature, which may be in the form of a paramagnetic disc (hidden in housing 68). The fixed core structure is annular and has a friction face equipped with suitable brake lining material opposed to a face of the slidable armature plate, so that when the brake field coil is energized the armature plate is drawn axially against the brake lining of the fixed magnetic core structure to clamp it thereto and prevent the driven cross shaft 55 from rotating. The clutch unit 67-2 is of somewhat similar structure with the field coil thereof also fixedly supported by housing 168 therewithin, which in turn is fixedly mounted to the frame sidewall 6. The annular core structure is carried by a hub keyed to the driven shaft 55. While the hub 169 of sprocket 158 is also keyed to the driven shaft 55, the drive sprocket 54 has its hub freely supported on this shaft for relative rotation and axial motion toward the keyed core structure, and sprocket 54 may be constructed of paramagnetic material to serve as the annular armature. Thus, when the field coil of the clutch unit 67-2 is energized, the drive sprocket 54 will be slid axially outward a short distance to have its outer face engage a friction facing of suitable material carried by the annular magnetic core structure keyed to the shaft, to connect the shaft and the conveyor chain driving sprockets 58 and 158 keyed thereto to the shaft drive sprocket 54. Since the magnetic brake and clutch units 67-1 and 67-2 are of conventional construction, further structural details thereof are not necessary to an understanding of their functions and operations, and they are alternately operated or energized for alternate periodic drive and pause of the chain conveyor section.

As will be understood from FIGS. 1 and 3, the support structure 3 includes an opposed pair of upwardly-extending standards or columns 75 and 175 which constitute supports for the elevating head unit 2, and these columns are fixedly mounted to the frame sidewalls 5 and 6 of the bed unit 1 in any suitable manner. The columns 75 and 175 preferably are of channel construction so as to provide guiding channels 76 and 176 for head-supporting slides or carriage means therein, and to house elevating mechanism. Opposite ends of the cross shaft 63 extend into the channels 76 and 176 and are fixedly mounted to these columns by any suitable means, such as stud bolts 77. Within the channels 76 and 176, fixed cross shaft 63 rotatably supports sprockets 78 and 178, forming a part of head elevating mechanism.

As will be understood from FIGS. 2 and 3, the bed unit 1 is equipped with suitable carton clamping and carton travel guiding means, preferably extending from the vicinity of the entrance end to a distance short of the discharge end of the bed unit 1, but entirely through the carton sensing and flap folding station in the vicinity of the discharge end of the initial conveyor section or belt 27. This carton clamping and guiding structure may be in the form of a pair of rails 80 and 180, which may be of channel formation, as shown, to provide on the inner sides thereof opposed upstanding flanges 81 and 181. As will be understood from FIGS. 2 and 3, the clamping and guiding rails 80 and 180 are suitably supported by a pair of transverse rods 82 and 83 mounted to the frame sidewalls 5 and 6. Each of the rods 82 and 83 supports a pair of slides 84 and 184 carrying bracket arms 85 and 185 to each of which is mounted one of the rails 80 and 180. Thus, the guiding and clamping rails 80 and 180 are slidably supported on transverse rods 82 and 83 for transverse movement inward and outward relative to the center of the path of carton travel defined by the longitudinally-extending conveyor means. In their outward positions, depicted in FIGS. 2 and 3, the rails 80 and 180 are at their initial carton-receptive positions to permit a carton feed over depressed gate 12 to the entrance end of the initial conveyor section belt 27 to advance therebetween. The front end of each of the rails 80 and 180 preferably is equipped with a freely rotating carton guide roller 86 to facilitate entrance of a carton therebetween.

The clamping and guiding rails 80 and 180 are slid transversely back and forth on the guide rods 82 and 83 by suitable driving mechanism. Such rail driving mechanism may be in the form of a fluid pressure motor, such as a pneumatic cylinder 87 of the double-action type having its piston head 88 equipped with a through piston rod 89. The rail driving mechanism includes lateral sprockets 90, 91, 92, 93, 94 and 95. Sprockets 90 and 92 are supported on frame sidewall 5 by a bracket 96 while sprockets 93 and 95 are supported by a similar, reversely-shaped bracket 196. Sprocket 91 is supported on sidewall 6 by a bracket 97 and a bracket 98 is employed to support sprocket 94 on the latter sidewall, as will be understood from FIG. 2. Lengths of link chain are lapped about the sprockets 90 to 95 inclusive and anchored to opposite ends of the piston rod 89, with suitable connections to the slides 84 and 184 to drive the rails 80 and 180 transversely inward and outward. For example, a length 99 of such link chain is anchored to the right end of piston rod 89 as viewed in FIG. 2 and lapped about sprocket 90 to extend transversely to an anchor bolt 100 carried by slide 184 on slide rod 83. Slide 184 also carries another chain anchor bolt 200 to which one end of another chain length 199 is anchored, with the latter lapped about sprocket 91 to extend transversely back to another anchor bolt 300 carried by slide 84 on slide rod 83. The latter slide 84 also carries an additional anchor bolt 400 to which a third length 299 of the chain is connected, with the latter lapped about sprocket 92 to extend longitudinally back for lap about sprocket 93 and then transversely to a fifth anchor bolt 500 carried in like manner by slide 184 on slide rod 82. This latter slide 184 also carries another anchor bolt 600 to which a fourth length of chain 399 is anchored and then lapped about sprocket 94 to extend transversely back to an additional anchor bolt 700 carried by slide 84 on slide rod 82, with a further anchor bolt 800 on the latter slide having connected thereto a fifth length of chain 499 lapped about sprocket 95 to extend longitudinally forward to connection with the left hand end of the piston rod 89. Thus, when the piston rod 89 of the pneumatic cylinder 87 is slid longitudinally to the right, as viewed in FIG. 2, the clamping and guiding rails 80 and 180 are driven transversely outward to their initial carton-receptive positions shown therein, and when the piston rod is then reciprocated in the opposite direction to the left in FIG. 2 these rails are driven transversely inward toward each other for approach of their inside flanges 81 and 181 to opposite sides of a carton delivered therebetween.

A clamping device is provided in association with the sprocket 94, to hold the guiding and clamping rails 80 and 180 in an adjusted position, such as the initial retracted position illustrated in FIGS. 2 and 3. Such clamping means may include another pneumatic cylinder 101 of the double-action type, having its piston head carried by a piston rod which exteriorly of the cylinder is connected to or abutted against an arcuate clamping shoe 104. The arcuate clamping shoe 104 is slidably mounted on guiding means supported by a bracket 107 mounted to frame sidewall 6. This guiding means also supports a fixedly mounted arcuate clamping shoe 108 in opposed relation to the shoe 104. A cylindrical hub of the sprocket 94 is located between opposed arcuate faces of the clamping shoes 104 and 108, so that when the latter are forced toward each other by feed of pressurized fluid or air to the cylinder 101 behind its piston head, this sprocket is clamped in stop position to hold the rails 80 and 180 in their relative adjusted positions. The space in the cylinder 101 ahead of its piston is vented when pressurized air is fed to the space therebehind, and when the functions of these conduits are reversed the pressurized air is fed to the space in front of the piston head to retract the clamping shoe 104 and free sprocket 94, so as to permit pneumatic cylinder 87 to adjust the relative positions of the rails 80 and 180 by transverse drive.

The front end of guiding and clamping rail 180 carries opposite the belt conveyor section 27, in the area of the carton sensing and flap folding station clearance means 114 and an adjustable control or sensing device 115, as will be seen in FIG. 2. The clearance means 114 is in the form of a pivoted arm 116. A section of the inward side flange 181 of rail 180 is cut out and clearance arm 116 is pivotally supported at 117 therein, with its free end 118 extending in the direction of carton forward travel. In order to actuate the clearance arm 116 from a retracted full line position, shown in FIG. 2 by swinging it inward away from the rail a fraction of an inch a third pneumatic cylinder, of the single action type, 119 is provided on the rail. The outer side flange 281 of rail 180 supports the back end of the pneumatic cylinder 119, and its piston head carries a piston rod connected by a knuckle 123 to the back side of the free end 118 of the clearance arm 116. Thus, when pressurized air is fed to the back end of cylinder 119 its piston head and its piston rod are thrust forward to swing free end 118 of the clearance arm 116 inward a short distance to carton-clamping position. The clearance arm 116 may be retracted toward its full line position upon discontinuance of feed of the pressurized air to the back end of cylinder 119, as a result of resistive force applied thereto by contact with a carton sidewall when the carton is clamped between the rails 80 and 180 at this point. If desired, such retraction of the clearance arm 116 may be more positively or fully attained by mounting a helical compression spring about the piston rod within the head space of the cylinder 119 in front of its piston head.

Figure 4:
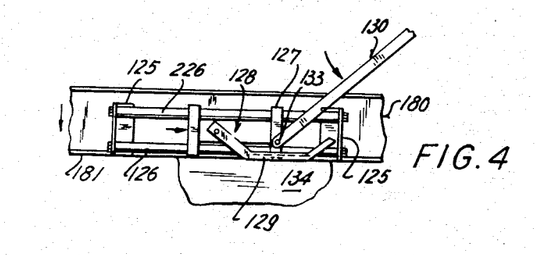
FIG. 4 is a top plan view, with parts broken away, of physical carton sensing control means in the form of an electrical circuit switch, mounted for adjustable translation along the carton travel path shown in FIG. 2 to be located between the selector gate and head elevating mechanism at the sensing station, illustrating a portion of a carton thereat which effects operation of this switch by means of the unique manipulating arm of the present invention.
Figure 7:
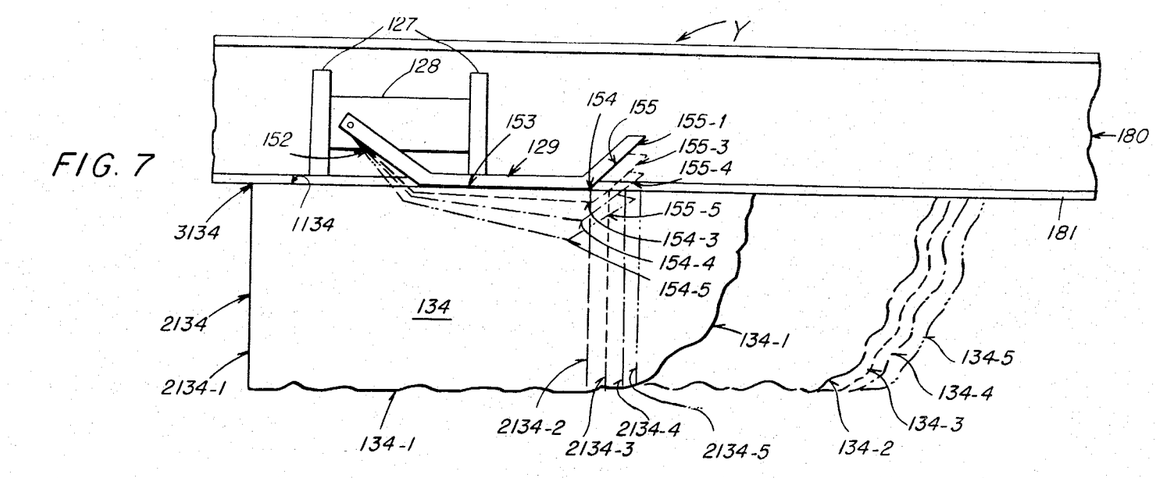
FIG. 7 is a view similar to FIG. 4 but to larger scale, showing a plurality of successive positions of advance of the carton portion depicted therein and illustrating the respective positions of the switch manipulating arm dictated by these carton positions.

For the purpose of supporting the adjustable control 115 upon the guiding and clamping rail 180, the latter carries a pair of opposed brackets 125 (see FIGS. 2 and 4). The brackets 125 support therebetween a pair of longitudinally-extending guide rods 126 and 226 upon which a carriage 127 is slidably mounted. Carriage 127 supports a control device 128, which may be in the form of an electrical circuit switch biased to one of its open and closed positions and manipulated to the other thereof by an actuating arm 129. As will be understood from FIGS. 2 and 4, the switch actuating arm 129 is elongated and extends longitudinally forward while having its mid-section shaped to be disposed substantially parallel to the inward face of flange 181 of rail 180 when retracted or swung back by contact with carton side structure. Thus, when the rails 80 and 180 are driven inward toward each other with a carton disposed therebetween opposite the control 115, the back side of the carton which is opposed to the switch operating arm 129 will first be contacted thereby. Then, as the rails 80 and 180 are brought to clamping positions against the opposite sides of the carton, this switch operating arm 129 will be retracted or pushed back to the position of FIG. 4 to operate the switch 128. The control device comprising switch 128 and its actuating arm 129 are automatically adjustable along the path of carton forward travel as dictated by the width of the carton. For example, a narrow carton causes the clamping rails 80 and 180 to be driven inward toward each other an appreciable distance and the control device 128 will be advanced forward an appreciable distance. With wider cartons, where inward travel of the clamping rails 80 and 180 is relatively small, the control device 128 will be advanced forward only a short distance. This automatic adjustment of the position of the control device 128 is attained by substantially rigid tie means pivotally connected to the fixed structure of the bed frame and to the control carriage 127. For example, elongated rigid arm or strap 130 is pivotally mounted at 131 to bed frame wall 6, with its other end pivotally connected at 133 to the carriage 127, as will be understood from FIGS. 2 and 4. Thus, as rail 180 is driven transversely inward toward the center of the longitudinal path of carton forward travel, the tie 130 is swung counterclockwise to pull the control carriage 127 forward along the guide rods 126 and 226. This forward adjustment of the position of the control device 115 is proportionate to the width of the carton at the carton sensing and flap folding station, and this forward adjustment action, as well as the retraction of the actuating arm 129, is illustrated in FIGS. 4 and 7, wherein a sidewall portion of a carton 134 to which is abutted inner side flange 181 of rail 180 with the actuating arm 129 retracted for alignment of its mid-portion therewith.

The bed unit 1 also is provided with additional control equipment. As will be seen from FIG. 1, the frame of the bed unit 1 supports a limit control 135, which may be in the form of electrical circuit switching means having a plurality of switches mechanically linked together for simultaneous operation. The limit switch 135 is provided with an actuating trigger 136 designed to be swung up and down and biased to its downward position with a drag roller 137 carried by its lower end. Limit switch 135 preferably is supported upon ledge 10 beyond the head-supporting upright column 75, such as in the vicinity of the location X indicated in FIG. 3, so that the roller 137 on the actuating trigger 136 will be dragged over the next oncoming traveling lug 66–1 or 66–2 carried by conveyor chain 59. When the upper run of conveyor chain 59 in its forward travel causes lug 66–1 to engage the trigger 136, the latter will be swung up to actuate the switches in the limit switch unit 135, and the circuit switches thereof will be held to their respective manipulated positions until this run of the conveyor chain advances sufficiently to free the trigger and thus permit the limit switches to be returned to their initial positions. The limit switch unit 135 is provided for "Random" operation of the machine, i.e., to close random size cartons. For operation of the machine to close uniform size cartons, it may be set to a "Uniform" setting and, for this purpose, the machine will be equipped with another limit switch unit of a construction similar to that at 135 except for the number of circuit switches controlled thereby. This second limit switch unit preferably is supported on the opposite ledge 11 substantially opposite to the location of limit switch unit 135 on ledge 10, with its actuating trigger depending for drag against a plurality of lugs carried by conveyor chain 159, and with each associated with one of the flights 64.

The clearance lever 116 and the switch actuating arm 129 constitute physical sensing devices for contact with the side of a carton at the sensing station. Additional sensing devices are provided on the bed unit 1, which may be in the form of optical carton sensing devices. For example, as will be seen from FIGS. 1 and 2, the ledge 10 may support at 138, in the vicinity of the selector gate 12 and slightly in advance thereof a photocell responsive to the light beam from a light source 139 supported on the opposite side by ledge 11. At the sensing and flap folding station, preferably opposite the clearance means device 114 ledge 10 may support in similar fashion, substantially at the point 140, a second photocell arranged opposite to a second light source for response to the beam thereof, with the latter being located substantially at the point 141. The functions of the photocells at 138 and 140 will be explained in connection with the wiring diagram of FIG. 6 and the operation of the machine detailed hereinafter.

In FIG. 1 is shown in dot-dash lines an open-top carton 134 located opposite the photocell optical sensing device 140 at the sensing and flap folding station Y, beneath a flap folding and carton closing head 142 supported for elevating travel upon the upright columns 75 and 175. Head 142 includes a lateral frame member or beam 143 from which depends a post 144. The bottom end of depending post 144 pivotally carries at 145 a front flap folding arm structure 146, which, due to gravity biasing, normally depends in the top elevated position of the head 142 shown in FIG. 1 obliquely down and forward to the full line position shown in FIG. 1. The front flap folding arm structure 146 carries a finger 147 which engages a trigger 148 of another limit control, which may be an electrical circuit switch device 149 supported on the post 144. In the full line position of the front flap folding arm structure 146 shown in FIG. 1 its finger 147 holds the switch trigger 148 forward to a tripped position to hold the switch in one of its open and closed positions. When the front flap folding arm structure 146 is swung upward to a lateral position, indicated by broken lines in FIG. 1, the trigger 148 of switch 149 is released to permit the switch to be actuated to the other of its two positions. The bottom of the depending post 144 has anchored thereto, such as by welding, one end of a folded flap hold-down device in the form of a resilient presser strip 150, which extends forward with its free end unsupported, to cooperate with the front flap folding arm structure 146. As will be seen from FIGS. 1 and 5, the flap holddown strip 150 may have a continuating portion at its anchored back end, which is turned up obliquely and then inward to additional anchorage to the depending post 144, so as to provide a wedge-shaped stop 250 for a back flap folding arm or kicker hereinafter described.

The elevating flap folding head 142 also may have a forwardly extending lateral frame member A which supports suitable flap securing mechanism, which may be tape applying means of the type disclosed in our co-pending application for United States Letters Patent, Ser. No. 139,676, including pairs of wipe down arms B and C, to which are supplied from a suitabl etape supply reel D lengths of gummed tape to be adhesively affixed over overlapping flaps of a carton top after the flaps have been folded down in stacked or overlapping relation. Similar tape applying devices are carried by the bed unit 1, including another adhesive tape supply reel E (see FIGS. 1 and 2), tape feed and drive sprockets 40, 44 and 45, tape mechanism cross shaft 47 and its drive sprocket 46, tape feed actuators F (supported on rail 180, see FIG. 3) and associated structure.

The lateral frame member or beam 143 of head 142 pivotally supports at 151 a carton back flap folding arm or kicker 161, as will be seen from FIG. 1. The back flap folding arm or kicker 161 is normally held in an extended or substantially lateral position when the flap folding head 142 is elevated to the maximum height of its vertical travel, as is shown in FIG. 1. For this purpose the lateral beam 143 carries a kicker actuating means, preferably in the form of a pneumatic cylinder 163, as is shown in FIG. 1 and diagrammatically illustrated in FIG. 5. This pneumatic cylinder 163 is of the double-action type with pressurized fluid being alternately fed to opposite ends on opposite sides of its piston head 164 by suitable conduit means, such as 165 and 166. Piston rod 167 connected to piston head 164 of the pneumatic cylinder 163 is connected by a knuckle to a lever arm fixed to the pivoted kicker 161. Thus, when pressurized air is supplied to the back end of pneumatic cylinder 163 through conduit 166, the rear flap kicker 161 is swung backward and upwardly to its substantially lateral cocked position, shown in FIG. 1, with the head space of the cylinder in front of piston head 164 being vented by conduit 165. It will be seen from FIG. 1 that the bottom side of the rear flap kicker 161 is provided with a depending tapered nose 172 having an oblique rear face 173–1 which, when the kicker is swung down to its depending position indicated in dot-dash lines in FIG. 1, is oriented to substantial parallelism with the oblique stop 250. The cocked kicker 161 is swung down to this position to engage or strike the rear face of an upstanding back flap on the trailing end of the open top of a carton and kick it forward to folded lateral position by reversing the pneumatic connections to cylinder 163, i.e., by supplying pressurized fluid or air to conduit 165 and venting through conduit 166, to retract the piston rod 167. When the kicker 161 is swung down the oblique rear face 173–2 of its tapered nose 172 provides a flat lateral bottom surface substantially in the horizontal plane of the bottom surface 146–1 of front flap folding arm structure 146 when swung up, as are indicated in dot-dash lines in FIG. 1. These aligned bottom surfaces of the flap folding arms 146 and 161 maintain the folded front and back flaps in a common lateral plane during forward transport of the carton which effects the folding down of the side flaps.

The top of the column 75 and 175, which support the head 2 for vertical reciprocation, fixedly support at their top ends a reversing electric motor 174, as is indicated in FIG. 1. The drive of reversing motor 174 is suitably geared to a pair of top drive sprockets 177 and 277 carried by the top ends of the columns 75 and 175. Drive chain 178 is lapped about drive sprocket 177 in the vicinity of the top end of column channel 75 and about the bottom idler sprocket 78, shown in FIG. 3 with opposed ends thereof anchored by suitable means at 179 to a slide 182 riding up and down in channel 76. In similar fashion, a like chain (not shown) is lapped about the far top sprocket 277 and bottom idler sprocket 178, and is anchored in like fashion to a similar slide of reversed form located in channel 176 of column 175. The opposed pair of slides 182 are suitably tied together to act as a carriage unit. The carriage comprising the pair of slides 182 and its companion suitably support the lateral frame member or beam 143 for vertical travel down and up therewith. Thus, when the reversing vertical travel motor 174 is driven in one direction the entire head structure 2 is lowered to position its flap folding means above an open top carton at the sensing and flap folding station, such carton being indicated at Y in FIG. 1, and when driven in the opposite direction will lift this head structure to its initial elevated position, such as that indicated in full lines in FIG. 1.

Maximum limits of up and down motion of the head structure 2 are dictated by suitable limit means, which may be in the form of switch means in electrical circuitry of the reversing motor 174. Such switch means may be of the double-throw type so as alternately to open the energizing circuits of the reversing motor 174 to limit the down and up drive thereof. Such reversing motor control switch unit 186 is suitably mounted on slide 182. Switch unit 186 is provided with a double-action actuating trigger carrying a roller 188 arranged to be abutted in its up and down travel to top and bottom stop collars 189 and 190, fixed upon a vertical control rod 191 supported by bed unit frame ledge 10 and the back edge flange of column channel 75. The bottom stop collar 190 will limit lowering of the head structure 2, so as to assure that no parts thereof will be driven down to jam against any of the bed unit structure should the down energizing circuit of the reversing motor 174 accidentally be closed in the absence of a carton at the sensing and flap folding station, thus being provided as a safety measure.

Figure 5:
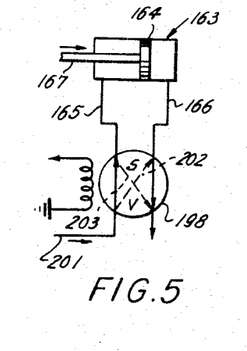
FIG. 5 is a diagrammatic view of pneumatic equipment for operating the back flap folder or kicker mounted on the head of the machine and shown in FIG. 1.

As will be seen from FIG. 5, the back flap folding kicker operating cylinder 163 is controlled by a four-way solenoid valve 198. Pressurized air fed through a supply conduit, indicated at 201, may, upon energization of four-way solenoid valve 198, be passed straight through to conduit 165 and to the head end of cylinder 163 to retract the piston rod 167, so as to swing the back flap folding kicker 161 down from cocked position, with the opposite end the cylinder 163 being vented to exhaust through conduit 166 and flow back straight through the solenoid valve 198. When four-way solenoid valve 198 is de-energized, the passages therethrough are cross-connected so that supply conduit 201 is thus communicated along the path 202 through the valve to the conduit 166, with cross communication of conduit 165 along the path 203 to the venting port, so as to cause the piston rod 167 to be thrust outwardly for swinging the depending back flap folding kicker 161 from its down position, indicated by dot-dash lines in FIG. 1, up to the cocked full line position thereof.

As will be seen from FIG. 1, the flap folding head structure 142 includes suitable carton side flap folding plows which extend from initial top ends at 234 obliquely down in an advance direction while converging toward each other. As is presently known in the art, plows of such shape will gradually turn over and fold down upwardly-extending carton flaps when they are moved forward to engagement of their outside faces against the inner sides of such plows.

Figure 6:
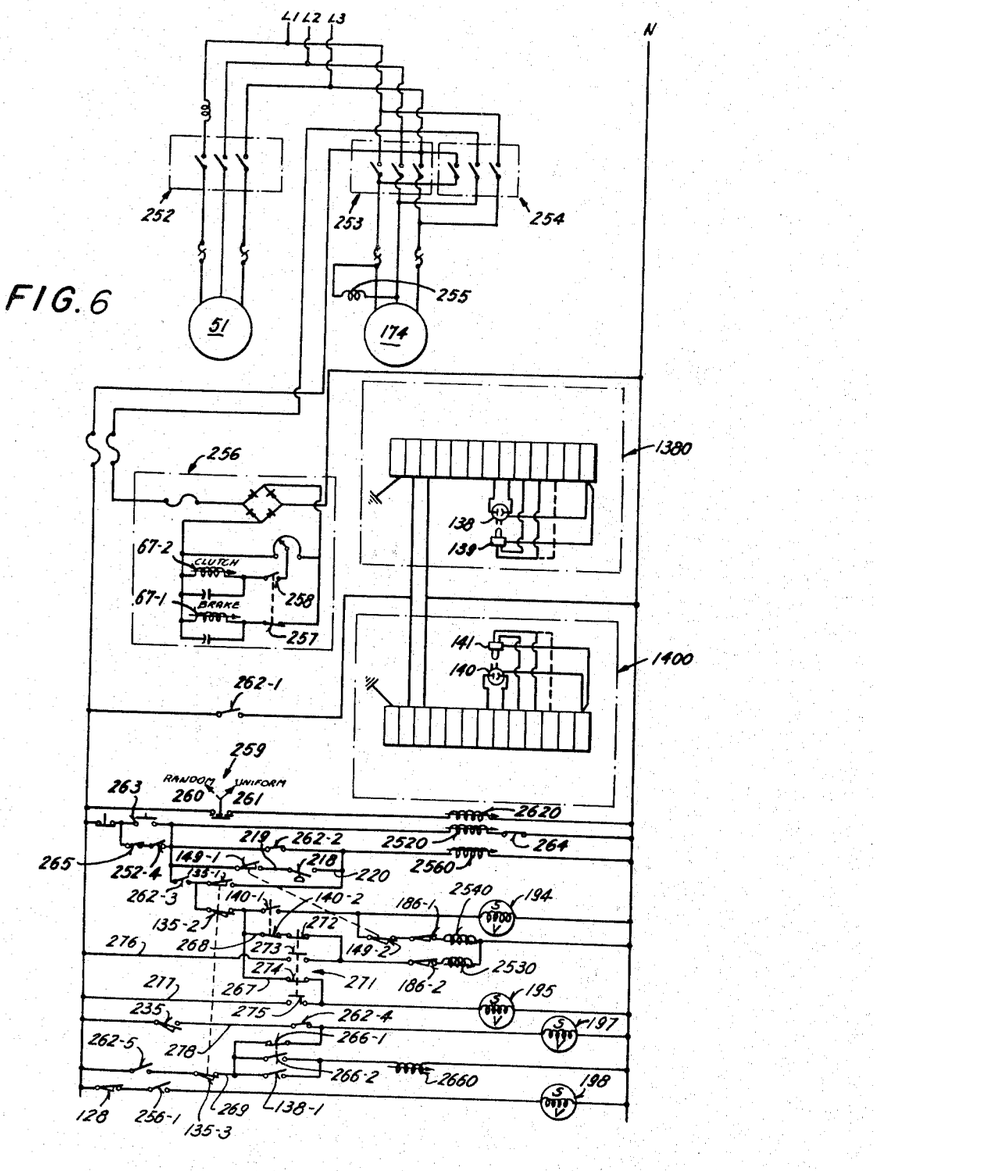
FIG. 6 is a schematic wiring diagram of the electrical circuitry of the machine depicted in FIGS. 1, 2 and 3.

In the circuitry of FIG. 6 switch 149–1 is one of a pair incorporated in the sensing switch unit 149 supported by the flap folding head 142 and is biased toward closure while being held open by the depending orientation of the front flap folding arm structure 146. The other switch 149–2 of this switch unit 149 is biased toward open position and is held closed by this depending orientation of the front flap folding arm structure 146. Thus, when the flap folding head 142 is lowered down over an open top carton 134 at the sensing and flap folding station Y in FIG. 1, with attendant upward swing of front flap folding arm structure 146 to the lateral position indicated in broken lines in FIG. 1 the trigger 148 of switch unit 149 is released to allow its switches 149–1 to close and 149–2 simultaneously to open, which is at the instant that the height of the carton at this station is sensed physically.

Energization of the solenoid valve 197 causes pressurized fluid or air to be supplied to the top ends of the pneumatic cylinders 18 to retract or lower the selector gate 12, thereby permitting entrance of the leading edge of the bottom of a carton in the position Z of FIG. 1 for advance over the lowered gate.

The selector gate 12 is lifted to beneath the bottom of the advancing carton and will be maintained in its lifted position to bar the entrance of the next oncoming carton while this carton is being permitted to slide forward over the gate roller 17 onto the initial conveyor section belt 27 for advance to the sensing and flap folding station opposite the photocell 140. Not until the holding relay coil 2660 is de-energized by opening of the limit switch 135–3, upon drive of the chain conveyor 59–159 to transport the carton from the sensing and flap folding station forward, will the gate retracting solenoid 197 be permitted again to be energized to permit entrance of the next succeeding carton. This successive periodic energization of the gate retracting solenoid 197 will be effected only when switch 266–1 is permitted to close by the de-energization of relay coil 2660 and the closure again of switch 135–3 by tripping of the limit switch unit 135 when the next lug 66–2 carried by conveyor chain 59 is moved to contact of its trigger 136. The moment that an entering carton 134 is supplied by the conveyor belt 27 to the sensing and flap folding station at Y (FIG. 1), to break the beam of light emanating from the light source at 141 directed to the photocell 140, the photocell system 1400 effects closure of switch 140–1 to energize solenoid valve 194 and manipulate it to the position of through flows, thereby permitting supply of pressurized fluid or air to the back end of the pneumatic cylinder 87 for drive of the clamping rails 80 and 180 inward toward each other to abut opposite sides of the carton at the sensing, or flap folding station. The closed switch 135–2 permits current to flow through conductor 267 to solenoid valve 195 to energize it for supplying the pressurized air to the back end of the pneumatic cylinder 87 for driving the clamping rails 80 and 180 inward toward each other to carton clamping positions. Simultaneously the pressurized air is supplied through energized valve 195 to the front end of the pneumatic cylinder 101 to release the rail driving mechanism clamp 104–108 and thus permit this rail driving action, while supplying the pressurized air to the pneumatic cylinder 119 to extend the clearance arm 116, so that the carton 134 in the position Y will be clamped between the approaching rail flange 81 and this extended clearance arm securely to hold the carton at this station for flap folding operations.

Upon closure of the switch 140–1, manipulated by the photocell system 1400 as a result of the presence of the clamped carton at the sensing and flap folding station, current is supplied through the closed head limit switch 149–2 and the closed downward travel limit switch 186–1 to relay coil 2540. The resulting energization of relay coil 2540 manipulates the switches of the "Down" AC starter 254 to closed positions effecting drive of the vertical motion motor 174 to lower the head down to the top of the carton pausing at the sensing and flap folding station. The lowering of the flap folding head 142 and attendant folding back and inward of the upwardly-extending front flap by the arm structure 146 is attended by upward swing of the latter to release the sensing limit switch unit 149, thus permitting closure of its switch 149–1 in the shunt circuit leading to relay coil 2560 and permitting simultaneous opening of the companion switch 149–2 thereof to de-energize relay coil 2540. As a result, the switches of the "Down" AC starter 254 are permitted to open and stop the motor 174 to discontinue downward drive of the flap folding head 142. Thus, the circuit to the relay coil 2560 is readied for closure so that the latter may be energized to release the brake 67–1 by opening switch 257 and engage the clutch 67–2 by closing the switch 258 for initiating drive of the chain conveyor 59–159.

There was connected in parallel from closed relay switch 135–2 a second circuit for effecting lift of the flap folding head 142, following this lowering action to the top of the carton and the attendant sensing of the height of the latter. This parallel circuit includes a conductor 268, in which the photocell switch 140–2 is located, and closed upward travel limit switch 186–2 leading to relay coil 2530. The pause of the carton at the sensing or flap folding station caused interruption of the light beam emanating from the light source at 141 to discontinue impingement thereof on photocell 140, so that the resulting de-excitation of the latter causes opening of the photocell switch 140–2 as photocell switch 140–1 is closed. Thus, the energizing circuit of relay coil 2530 is readied for energizing the latter. Upon withdrawal of the carton from the sensing or flap folding station by the driven chain conveyor 59–159, to permit impingement of the light beam from light source 141 again upon the photocell 140 for exciting the latter, switches 140–1 and 140–2 are manipulated by the photocell system 1400 to the positions indicated in FIG. 6 for effecting energization of relay coil 2530. The energization of relay coil 2530 causes it to close the switches of the "Up" AC starter 253 to effect reverse drive of the vertical motion motor 174, so that the latter will lift the flap folding head 142 until the vertical travel limit switch 186–2 is opened by engagement of the switch trigger 187 with the limit collar 193. The lift of the flap folding head 142 frees the front flap folding arm structure 146 from engagement of the carton top to permit it again to swing down to the depending position shown in full lines in FIG. 1, thereby tripping the limit switch unit 149, again to open the switch 149–1 and close the switch 149–2, so as to ready the circuitry for again lowering the flap folding head in the next cycle of operation on the succeeding carton.

When the clamping and guiding rails 80 and 180 are driven inwardly to engage flange 81 of the former and extended clearance arm 116 of the latter to opposite sides of the carton 134 at the sensing and flap folding station the supply of pressurized air to the back end of pneumatic cylinder 87 is prevented from driving its piston 88 forward, but the pressurized air is continued to be supplied straight through energized solenoids 195 and 194 to the pressure switch 218 so as to build up the pressure in the latter to ultimate closure of the pressure switch 218. Upon closure of the pressure switch 218 relay coil 2560 is energized to open the magnetic brake circuit at switch 257 and close the magnetic clutch circuit at switch 258 to effect the drive of the chain conveyor 59–159. The resulting travel of the chain conveyor 59–159 drags the limit switch trip lug 66–1 from beneath trigger 136 of the limit switch 135, thus permitting its held open switch 135–1 to close with simultaneous opening of its switches 135–2 and 135–3. Since switch 262–3 is held closed by continued energization of relay coil 2620 a holding circuit, shunted around head limit switch 149–1 and pressure switch 218, is completed through closed switches 262–3 and 135–1 to maintain the energization of relay coil 2560 for continuing the closure of the magnetic clutch circuit switch 258 while the magnetic brake circuit is continued to be held open at switch 257. This condition is continued until the following trip lug 66–2 carried by conveyor chain 59 moves forward to drag beneath the trigger 136 of the limit switch 135 to effect opening of the holding circuit to relay coil 2560 at the limit switch 135–1, as will be understood from FIG. 6.

The drive of the chain conveyor 59–159 ultimately causes the next successive carton pick up flight 64 thereof to move in behind the carton 134 pausing at the sensing and flap folding station and pick it up for forward transportation therefrom. The withdrawal of the carton 134 from the sensing and flap folding station by the chain conveyor 59–159 and its next following flight 64 brought to abutment of the back edge of the carton is accompanied by the de-energization of both solenoid valves 194 and 195 effected by the opening of the limit switch 135–2. A flow passage through de-energized solenoid valve 194 is thus readied for later supply of pressurized air to the opposite end of the pneumatic cylinder 87, so that the latter can reversely drive the rail operating mechanism at a future time to retract the latter from each other for free reception of next carton therebetween, and the pressure switch unit 217 is vented back therethrough again to open the pressure switch 218 for readying the energizing circuit of relay coil 2560 for the successive cycle. The simultaneous de-energization of solenoid valve 195 reverses the flow passages therethrough so that no pressurized air is being supplied to solenoid valve 194, and the pneumatic cylinder 119 and the front end of pneumatic cylinder 101 are vented back through de-energized solenoid 195. Pressurized air is thus supplied through the latter to the back end of clamp operating pneumatic cylinder 101 to apply the clamp 104–108 to the rail driving mechanism, thereby holding the rails 80 and 180 in their inward positions. The simultaneous venting of the pneumatic cylinder 119 withdraws forward thrust from the clearance arm 116 so that no wthe carton 134 may be freely transported forward between the rails 80 and 180 in the inward positions of the latter, so that these rails will cooperatively provide means to guide the carton in its forward travel toward the discharge end of the machine.

As was previously explained in connection with FIG. 5, the back flap kicker 161 is swung down to strike the top edge of the upwardly-extending rear top flap of the carton 134 and fold it forward down to the horizontal plane of the open top of the carton when the solenoid valve 198 is energized. The energizing circuit of solenoid valve 198 includes in series physical sensing switch 128, which is normally biased to closed position, and normally open switch 256–1, which is closed only when relay coil 2560 is energized. Since a carton 134 must be present at the sensing and flap folding station Y in order for the lowering of the head 142 to close the switch 149–1 as the front flap folding arm structure 146 effects its folding operation with upward swing to its lateral position, and this carton must be clamped thereat between the clamping rails 80 and 180 in their inward positions to cause a sufficient build up of pressure of the pressurized air fed to pressure switch 218 to effect closure of the pressure switch 218 in order initially to energize relay coil 2560, the closure of switch 256–1 is attained only after these conditions are satisfied. The closure of switch 256–1 is then maintained by the shunt circuit which includes limit switch 135–1, the latter being closed only as the chain conveyor 59–159 is driven to drag one of its tripping lugs 66–1 and 66–2 from beneath the trigger 136 of limit switch unit 135. Now, if during any such time of maintenance of closure of the relay switch 256–1 physical sensing switch 128 is permitted to attain its normally closed position, the solenoid valve 198 will be energized to swing the kicker 161 down for folding the back flap. Since the presence of a carton 134 at the sensing and flap folding station and its clamping between the rails 80 and 180 causes retraction of the operating arm 129 of sensing limit switch 128, this carton must be moved forward beyond the latter by travel of the chain conveyor 59–159 and the pick-up of the carton by the following flight 64 thereof to release the sensing switch operating arm 129 to effect the energization of solenoid valve 198 and operate the kicker 161. Consequently, the back flap of the open top of the carton 134 will be folded down to closed position only while the carton is being transported forward from the sensing and flap folding station Y beyond the physical sensing means comprising switch 128 and its operating arm 129. This back flap kicker 161 then remains down, with its bottom face 173–2 substantially in the plane of the bottom face 146–1 of the upwardly swung lateral front flap folding arm structure 146, until the limit switch unit 135 is again tripped by the next following lug 66–2 carried by conveyor chain 59 for opening the holding circuit of relay coil 2560 at the switch 135–1. The resultant de-energization by the opening of the switch 256–1 causes the solenoid valve 198 to be de-energized, so as to reverse the flow passages therethrough and supply the pressurized air to the back end of pneumatic cylinder 163 to cause the kicker 161 to be swung back up to its cocked position shown in full lines in FIG. 1.

While the carton 134 was pausing at the sensing and flap folding station Y it held the sensing arm 129 depressed, so that the rear flap kicker 161 was maintained in its extended cocked position. As soon as the partially closed carton 134 is picked up by the oncoming flight bar 64 of the chain conveyor 59–159 at the sensing and flap folding station and carried forward beyond the retracted physical sensing arm 129, the latter is released so that the cocked kicker 161 will be swung down, sharply to strike the rear side of the upwardly-extending back flap and fold it forward down to the plane of the folded front flap as the carton is being transported forward. These folded front and back flaps are then maintained in their folded positions as the carton travels forward further both by the lateral bottom surfaces 146–1 and 173–2 of the front folding flap arm structure 146 and the kicker 161, as well as by the presser plate 150. During this forward travel of the partially closed carton, the plows 233 and 333, carried by the flap folding head 142, engage the outer sides of the upwardly-extending side flaps and gradually turn the latter over and downward toward each other for stacking upon the folded front and back flaps, thereby completing the closure of the carton top.

It will be noted from FIG. 7 that it is unique and important to have the forwardly-extending tip end or terminal section of the lever arm 129 for operating or manipulating the control means or switch 128 turned back at an oblique angle to and progressively farther back away from the forward path of carton travel. As has been previously pointed out it is this control means which dictates operation of the equipment or back flap-folding kicker 161 at a certain time in relation to the position of the carton 134 as it is transported forward through and from the flap folding station Y. As will be seen in FIG. 7 the operating lever arm 129 has an outside edge 152 at least a portion of which contacts and bears against the opposed flat side face 1134 of the carton temporarily clamped in a stopped position against the inner side of guide rail 180, or structure carried thereby. This outside edge 152 of the operating lever arm 129 has an intermediate section 153 and an oblique terminal section 155 which meet at a junction point or corner 154. At least this junction point or corner 154, and preferably the entire intermediate edge section 153, contacts or bears against the carton sidewall 1134 as the carton is stopped at station Y by flight 164 of the temporarily undriven chain conveyor 59–159. This is caused by the fact that as the open top carton 134 was transported forward by the belt conveyor 27 to stop engagement at station Y of the transverse flight 164 of the temporarily undriven chain conveyor the guide rails 80 and 180 were separated a maximum distance, as shown in FIG. 2, with the operating arm 129 of the switch 128 spring-biased to the position there shown beyond the inner side flange 181 of the guide rail 180. When the guide rails 80 and 180 were moved inward toward each other to clamp the carton between the extended clearance lever 116 carried by the inside flange 181 of rail 180 and the opposed inside flange 81 of the rail 80 the sidewall 1134 of the carton 134 was first contacted by the junction point or corner 154. Then this lever arm was swung back in a counterclockwise direction to bring the intermediate edge section 153 thereof into substantial alignment with the face of rail inside flange 181 for carton sidewall engagement by substantially the entire length of this intermediate edge section, as is shown in full lines in FIGS. 4 and 7.

After the upwardly-extending front flap of the carton 134 was folded back and down by the front flap folder 146 with lowering of the head unit 2, the clearance lever 116 was freed to permit the slight retraction necessary to allow the carton to be transported forward from its position 134–1 shown in FIG. 7 by the chain conveyor 59–159 as the latter was started to effect this forward transport between the guide rails 80 and 180, as was previously explained. The resulting forward travel of the partially closed carton caused its side face 1134 to drag along in contact with the opposed intermediate edge section 153, in the position 153–1 of FIG. 7, of the switch-operating lever arm 129.

As is shown in FIG. 7, the trailing carton end wall 2134 is arranged transversely of and generally normal to this carton sidewall 1134 and they are joined together in a substantially sharp corner 3134 where this end wall and this sidewall are arranged substantially at 90° to each other. As the carton 134 is so moved from its position 134–1 to its forward position 134–2 the transverse end wall 2134 is moved from the position 2134–1 to the position 2134–2, a portion of which is shown in broken lines in FIG. 7. As is therein illustrated, during this forward carton travel the switch-operating lever arm 129 is maintained in its full line position shown in FIG. 7 to bring the trailing end wall 2134 and its corner 3134 substantially to alignment with the junction point or corner 154 of the lever arm edge 152.

Thereafter, as the carton 134 is moved further forward from its broken line position 134–2 shown in FIG. 7 to the dotted line position 134–3 with travel of its trailing end wall from the position 2134–2 to the position 2134–3 the lever arm edge junction point or corner 154 drops gradually behind the carton corner 3134 to permit the lever arm 129 to swing out progressively with wipe across the carton corner 3134 by the terminal edge section 155. Thus the lever arm edge 152 and its intermediate edge section 153 and terminal edge section 155 swing out to the dotted line positions 153–3 and 155–3, shown in FIG. 7.

Further forward transport of the carton 134 from its dotted line position 134–3 to its FIG. 7 dot-dash position 134–4 permits the terminal edge section 155 gradually to wipe further past the carton corner 3134 to locate the intermediate edge section 153 and the terminal edge section 155 in the respective dot-dash positions 153–4 and 155–4. Finally, as the carton is carried still farther forward from its dot-dash position 134–4 to its dot-dot-dash position 134–5 the terminal edge section 155 of the switch-operating arm 129 wipes progressively farther past the carton rear corner 3134 until its tip end is freed therebehind. As a result the lever arm 129 is permitted to return to its initial position of FIG. 2 with its intermediate edge section 153 and its terminal edge section 155 respectively located in the dot-dot-dash positions 153–5 and 155–5 shown in FIG. 7.

It will thus be understood that by virtue of the provision of the oblique terminal section on the end of the switch-operating lever arm 129 abrupt or jerky motion thereof is eliminated as the trailing back end of the carton passes it. Consequently, chattering make and break of the circuit in which the switch 128 is embodied (such as the bottom bridge circuit shown in the wiring diagram of FIG. 6) is advantageously avoided. For example, if such a switch-operating lever arm was permitted to drop off of the trailing carton corner 3134 abruptly to its biased, outwardly-extending position to effect normal switch closure, it is possible that the switch contacts as they snap together may momentarily bounce apart to cause the control circuit for the back flap kicker 161 to open briefly, and this closing and opening may be repeated rapidly a number of times to cause action herein termed "chatter operation." Such undesirable operation of a control means in dictating operation of equipment on each package unit is eliminated by this turned or camming nose of the operating lever arm 129 of the control means.

It will be noted from FIGS. 2 and 6 that the arm 129 which manipulates the control switch 128 and the position of the latter are so located relative to the intended path of forward travel of the opposed sidewall of each of the successive package units (illustrated at 1134 in FIG. 7) and the arm intermediate edge section 153 is so oriented initially with respect to this path before carton 134 is delivered to station Y that certain other desirable characteristics and relational functions are advantageously attained. This orientation of the control means-manipulating arm 129 and its intermediate edge section 153 in the outwardly-biased position shown in FIG. 2 locates the latter with respect to the leading end of each oncoming carton sidewall as to cross obliquely in a forward direction the path of forward travel to be followed by the approaching carton sidewall 1134 in the event that the oncoming carton 134 is of a width only slightly less than the initial spacing between the opposed inside flanges 81 and 181 of the guide rails 80 and 180. In this event the intermediate edge section 153 of the control means-manipulating arm 129 in its initial free or outwardly-biased position crosses obliquely in a forward direction the path of the forwardly traveling sidewall leading end, i.e., its front corner, for engagement by the latter to be wiped progressively back thereover to effect gradual retraction of this arm until the edge junction point 154 of this arm bears against the opposed carton sidewall 1134. This action is particularly useful when such a control-manipulating arm is employed to operate the tape feed actuators F shown in the upper left hand corner of FIG. 3 and in FIGS. 8 et seq., as is indicated hereinafter. Thus, when such control-manipulating arm 129 is used to operate the switch 128 actuation thereof by relatively wide cartons is characterized by this gradual camming action. When relatively narrow cartons are passed through the top flap folding station "Y" the gradual retractive swing back of the switch control arm 129 may occur after the carton has been stopped by the blocking flight 164 of the non-traveling chain conveyor 59–159 as the guide rails 80 and 180 are moved inward toward each other to opposite sides of such carton. In the latter event (when such a carton is of relatively narrow width) the junction point or corner 154 of the switch-manipulating arm 129 is brought to bear against the opposed carton sidewall 1134 as guide rail 180 travels inward and then this arm is gradually and progressively retracted to attain the relative positions illustrated in FIGS. 4 and 7, so as to permit attainment of the advantage assured by the subsequent action of slow gradual relief to the maximum outwardly-biased initial position of the manipulating arm by virtue of the provision of the camming nose and its terminal edge section 155 as it wipes across the trailing back corner 3134 of the opposed carton sidewall 1134, previously described in connection with FIG. 7.

Figures 8, 9:
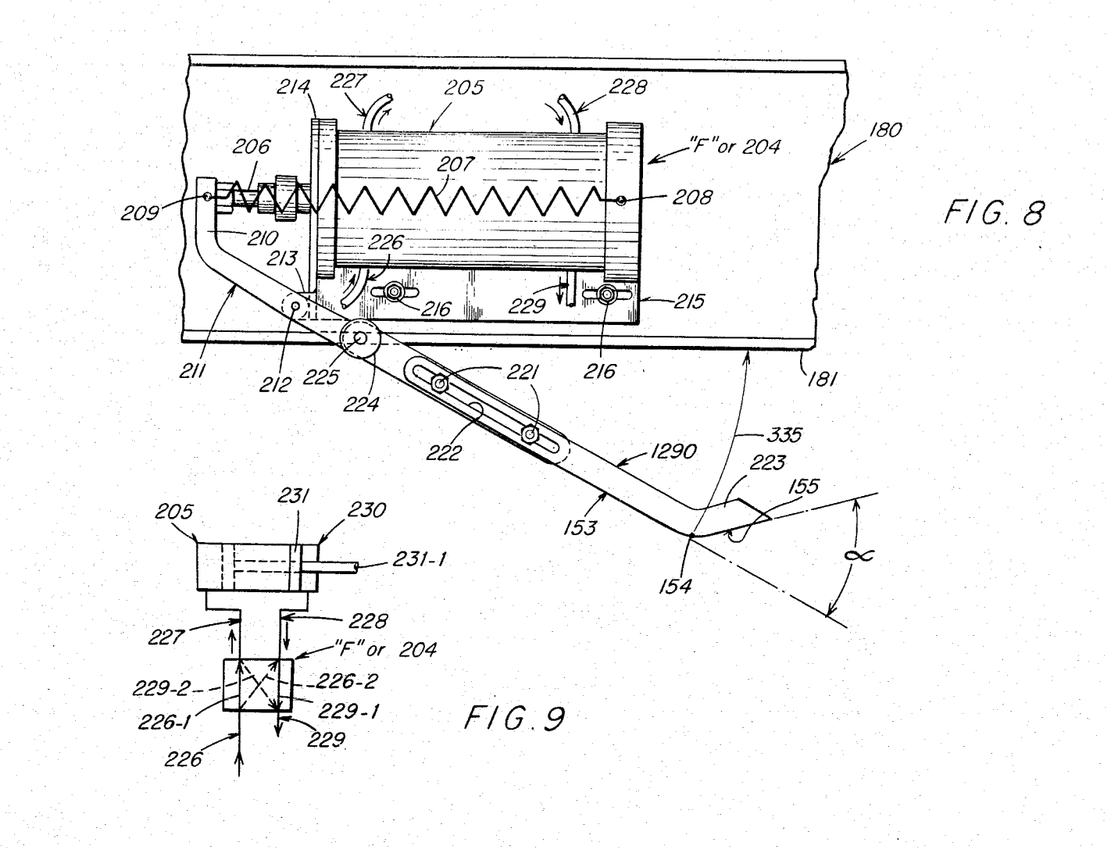
FIG. 8 is a side elevational view to larger scale, with parts broken away, of one of the control valves F shown in FIG. 3, which dictates periodic feed of gummed tape for binding down closed and overlapped carton top flaps, but with the mechanical valve operating arm which drags against the opposed side of each forwardly traveling closed carton equipped with the improved manipulating arm extension of the present invention.
FIG. 9 is a diagrammatic view similar to FIG. 5 of a pneumatic circuit which includes in lieu of the four-way solenoid valve the mechanically operated four-way valve of FIG. 8 and a pneumatic motor or cylinder which operates tape feeding and severing equipment.

In FIG. 8 is shown to enlarged scale one of the tape feed actuators 204, indicated at F in FIG. 3, which is equipped with an embodiment of the manipulating arm extension 1290 of the present invention. The tape feed actuator 204 is in the form of a conventional piston-type four-way valve having cylinder 205 in which a conventional valving head (not shown) is shifted longitudinally between two positions to effect flow therethrough in alternate paths of different directions. The valving head within the cylinder 205 is equipped with a thrust piston rod 206 and spring-biased outwardly conventionally by an internal spring (not shown). The internal outward spring-biasing of the valving head within the four-way valve cylinder 205 and its thrust piston rod 206 is counterbalanced by an external tension spring 207 having one end fastened at 208 to the far end of the valve cylinder 205 and its other end connected at 209 to a transverse section 210 of one end of a mechanical manipulating arm. This manipulating arm is in the form of lever 211 pivotally mounted at 212 to an ear 213 of an end plate 214, secured to the front end of valving cylinder 205. The internal spring-biasing of the valving head and piston rod 206 is weaker than that of the opposed tension spring 207, so that when the latter is free to act by pulling inward on the lever extension 210 with the manipulating arm extension 1290 free of contact with any passing carton structure this valving head and piston rod will be in their respective inward positions, as is indicated in FIG. 8. If the lever 211 is swung counterclockwise by retracting the manipulating arm extension 1290 as a result of passage of a closed carton along the inner flange 181 of guide rail 180 the lever extension 210 will be swung out to the left in FIG. 8 away from the end of the valving head rod 206 with stretch of the tension spring 207, thereby permitting the internal spring to shift the valving head and its operating rod 206 outward to the left. Fixed support of the four-way valve 204 on the guide rail 180 may be provided by any suitable means, such as a base plate 215, suitably equipped with adjustable slot and bolt connections 216 to permit adjustable anchorage thereof longitudinally of the guide rail 180.

The mechanical control lever 211 of the four-way valve 204 preferably has its manipulating arm extension 1290 connected thereto by suitable means permitting longitudinal adjustment. For this purpose the lever arm 211 may carry beyond its pivot point 212 a pair of clamping bolts 221 which ride within a longitudinal slot 222 in the extension 1290, so that when these bolts are tightened up this extension will become a fixed terminal section of the lever arm in a longitudinally adjusted position. The manipulating arm extension 1290 of the present invention is provided with turned or camming nose 223 having its outside terminal edge section 155 arranged at the angle α to the intermediate edge section 153 thereof, as in the FIG. 7 embodiment. While it may be preferred that the angle α be about 45° it has been found that the desired advantageous operating characteristics may be attained when the angle α is in the range of about 25°–50°, or even at a reasonable variance outside this range. The lever arm 211 may advantageously carry a free roller 224 pivotally mounted thereon at 225 so as to facilitate drag of the opposed sidewall, such as 1134, of a forwardly traveling carton 134 therepast (as in FIG. 7).

The four-way valve cylinder 205 is equipped with suitable fluid flow passages, which may be provided as ducts leading from conduits or hoses 226, 227, 228 and 229. Conduit 226 may supply air under elevated pressure and conduits 227 and 228 may interconnect the four-way valve 204 with a suitable pneumatic motor or cylinder, while conduit 229 may be provided for communicating the fluid circuitry to atmosphere, i.e., for venting the fluid system.

As will be seen from the diagrammatic showing in FIG. 9 the four-way valve 204 may have its conduit 227 connected to one end of a pneumatic motor or cylinder 230 ahead of piston means 231 slidably mounted therein and equipped with a suitable piston rod 231–1 extending from the cylinder to perform work. Conduit 228 connects the other end of pneumatic motor cylinder 230, behind the piston head 231, to the opposite end of the four-way valve 204. It will be understood from FIG. 9 that, for example, when the four-way valve parts are in the positions of FIG. 8, with the piston rod 206 inward as there shown, supply conduit 226 may be connected by internal duct 226–1 directly through to conduit 227 for supply of pressurized air to the pneumatic motor cylinder 230 in front of piston head 231 of the latter and with the conduit 228 connected by internal duct 229–1 directly through to the venting outlet 229, leaving the piston head and its piston rod 231–1 in their initial positions of FIG. 11 (to the right as viewed in FIG. 9) and to hold them in these initial positions. When the lever arm 211 is swung counterclockwise to back off its extension arm 210 with stretch of the tension spring 207, thereby permitting the internal biasing spring to push the operating piston rod 206 outwardly, the connections through the four-way valve 204 will be reversed or shifted to those indicated in dotted lines in FIG. 9. Thus the supply conduit 226 will now be cross connected through internal duct 226–2 to conduit 228 and the vent 229 will be cross connected by duct 229–2 to conduit 27, so as to reverse the connections to the pneumatic motor 230 for retracting its piston head 231 and work performing piston rod 231–1 to the positions of FIG. 10 shown in dotted lines in FIG. 9.

It will be understood from FIGS. 10 to 13 inclusive that the pneumatic cylinder or motor 230 has the outer end of its piston rod 231–1 fitted with a bracket 301 carrying a pivot pin 302 rotatably engaged by the outer end of arm 303 of bell crank lever 304. The other arm 305 of bell crank lever 304 has its free end pivotally connected at 306 to one end of link 307 which in turn is pivotally connected at 308 to the free end of a pivoted guillotine blade structure 309.

Figure 10:
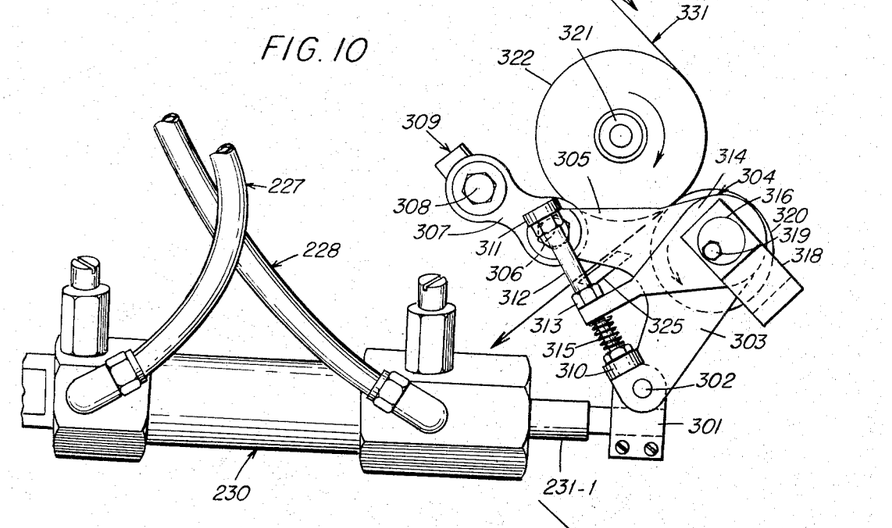
FIG. 10 is a rear elevational view, with parts broken away and omitted, of tape feeding and severing mechanism including the pneumatic motor or cylinder for operating it which is diagrammatically shown in FIG. 9, with the parts manipulated by the latter to positions for feeding a predetermined length of the tape and readied for severing it to provide a strip with its leading end depending in the path of the top leading corner and front end of an oncoming carton.
Figure 11:
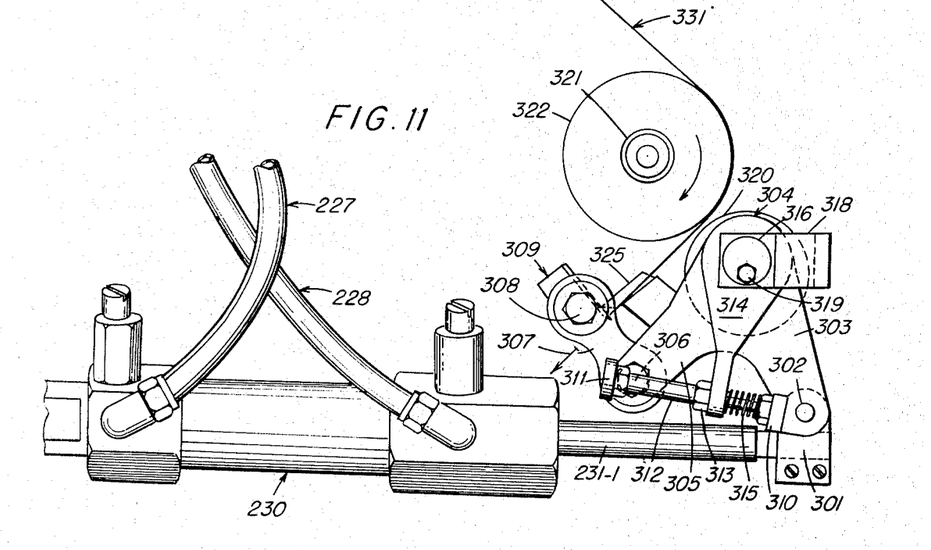
FIG. 11 is a view similar to FIG. 10 of the same mechanism and feeding and severing equipment with the feeding mechanism disengaged from the tape and the latter severed to provide the length of tape draped in the path of the oncoming carton.

As will be understood from FIGS. 10 and 11 bell crank arms 303 and 305 respectively carry ears 310 and 311 between which is bridged a rod 312, with the latter equipped with a screw-threaded adjustable nut 313. A lever arm 314 has its free end provided with a hole through which rod 312 extends and it abuts nut 313 by virtue of the biasing of a helical compression spring 315. As will be understood from FIG. 12 a pair of aligned stub shafts 316 are pivotally supported by laterally-spaced fixed frame plates 317 and one of these has lever arm 314 fixed thereto for rotation thereby as may be understood from FIGS. 10 and 11. The stub shafts 316 carry a U-shaped yoke 318 fixed to at least the one which fixedly carries its rotating arm 314, for swing therewith. Yoke 318 rotatably supports at an eccentric axis 319 a freely rotatable nip roller 320.

Figure 12:
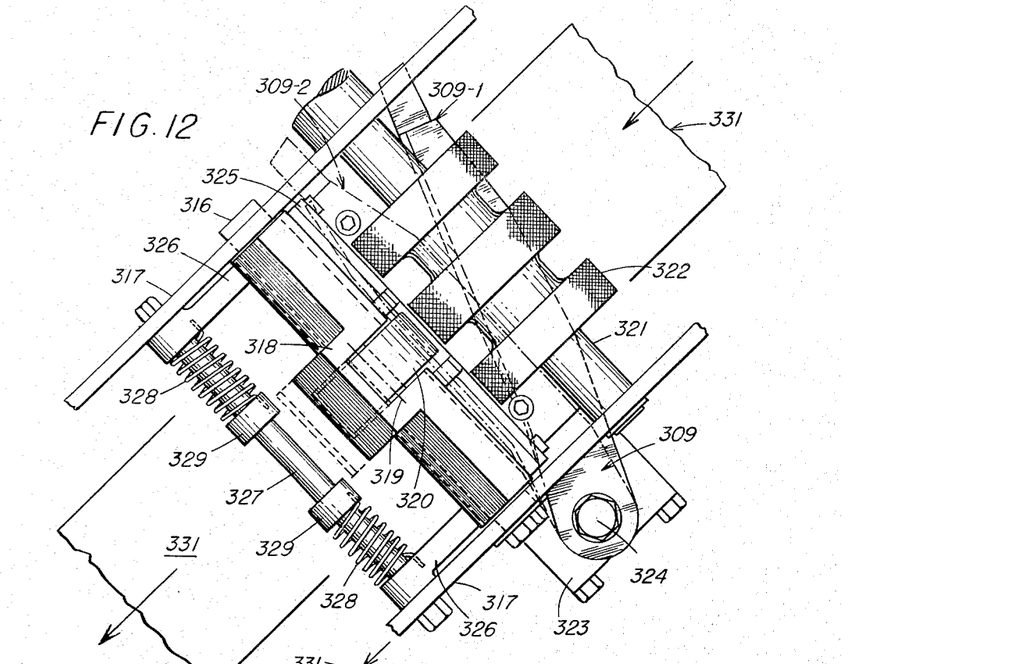
FIG. 12 is a front elevational view, with parts broken away and omitted, of the tape feeding and severing equipment shown to the right in FIGS. 10 and 11.
Figure 13:
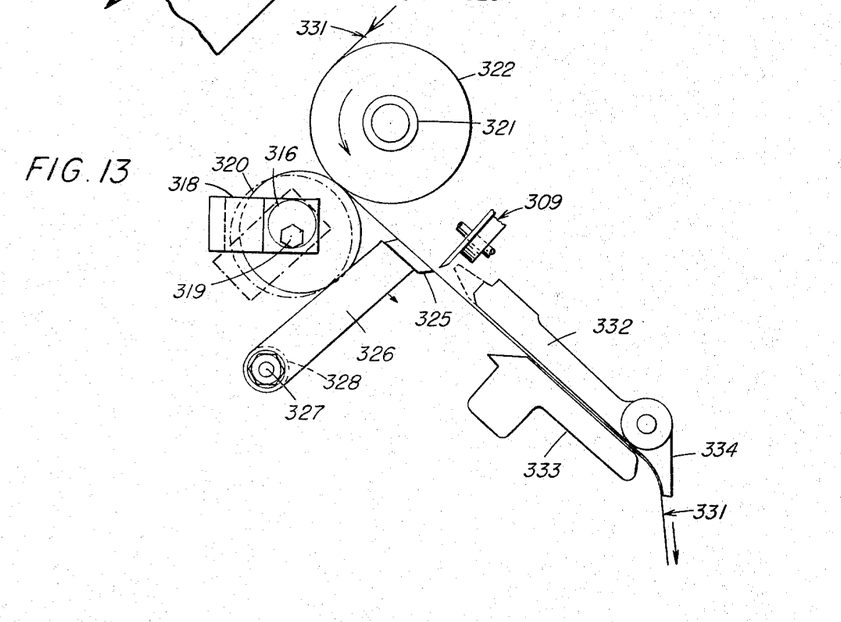
FIG. 13 is a front elevational view of some of the parts including the tape feeding equipment and the severing means shown in the right side of FIG. 10, indicating feed therethrough of a length of the tape prior to severance, some parts being indicated diagrammatically rather than to scale.

The end plates 317 also support therebetween a rotatable cross shaft 321, as will be seen in FIG. 12, with this cross shaft carrying fixed thereto a knurled tape-driving roller 322, and with this cross shaft being constantly driven from any suitable means. As will be seen in FIG. 12 one of the frame plates 317 also carries a bracket 323 upon which is pivotally mounted at 324 guillotine blade assembly 309 to be swung inward from the full line position 309–1 to the dot-dash position 309–2 by link 307 (FIGS. 10 and 11), for cooperation with bed blade 325. Transverse bed blade 325 is supported by a pair of pivoted arms 326 rotatably mounted upon transverse shaft 327 extending between and fixedly mounted to side plates 317. A pair of spiral springs 328 are arranged about sections of the fixed shaft 327 with each having one end anchored in a collar 329 fixed to this shaft and the other end thereof anchored in one of the arms 326, so as to bias the latter and the bed blade 325 toward the path of the sharp edge of the guillotine blade assembly 309.

Let it be assumed that gummed tape is fed from a supply reel D (FIG. 1) to the elevating lateral frame member A for application of a length thereof to the closed top of an oncoming carton 134 by means of wipe down arms B and C. This lateral frame member A carries the tape feed mechanism and guillotine equipment of FIGS. 10 to 13 inclusive with the leading end of such gummed tape 331 trained over constantly driven tape driving roll 322 and then forward first between bed blade 325 and swinging blade assembly 309 and then between guide plates 332 and 333 (see FIG. 13). Guide plate 332 preferably carries a guide nose 334 to direct the leading end of the tape 31 downwardly to be in the path of the leading end of the closed oncoming carton 134.

Prior to engagement of the oblique forward end of the control lever arm 211 by the leading end of the oncoming carton 134 the four-way valve 204 maintains the full line connections of the pneumatic system indicated in FIG. 9, whereby the pneumatic motor piston rod 231–1 is held in the forward or extended position of FIG. 11. In this initial position of FIG. 11 the lever arm 314 is in the retracted position there shown so that it dictates the shown retracted positions of the yoke 318 and the axis 319 of the idle roll 304. As is also therein shown, idle roll 304 in its initial position is spaced from driven roll 322 so that the latter merely slides against the gummed tape 331 without drive of the latter, and with the guillotine blades 309 and 325 in their relative positions following a tape severance action which includes the advance of the former relative to the latter.

As the leading end of the closed oncoming carton 134 is guided along the inside flange 181 of guide rail 180 it abuts against the obliquely arranged forward end of pivoted lever arm 211 to cause the latter to swing counterclockwise as viewed in FIG. 8, i.e., retracted toward the inside guide flange 181 in the direction of the arrow 335. Such counterclockwise swing of lever arm 211 effects the dotted line connections through the four-way valve 204 shown in FIG. 9, so that now the supply conduit 226 is cross connected through cross connection 226–2 to conduit 228 and thus to the pneumatic motor or cylinder 230 behind the piston head 231 to retract it and its piston rod 231–1 to the position illustrated in FIG. 10. This causes the bell crank lever 304 and the yoke 318 to be driven thereby clockwise from the position of FIG. 11 to the position of FIG. 10, so as to swing the axis 319 of the idle roll 304 forward clockwise through a radial angle to carry this roll forward toward constantly driven roll 322 and nip the leading end of the tape 331 extending therebetween for advancing the latter. As a result, constantly driven roll 322 advances or drives the gummed tape 331 forward. Simultaneously with this clockwise swing of the bell crank lever 304 the latter pushes the link 307 up to retract the knife assembly 309 relative to the nose of the bed blade 325 to permit the leading end of the tape 331 to advance therebetween and to be loosely supported in the slot between the guide plates 332 and 333 with its depending front end hanging in the path of the oncoming leading top portion of the front end of the advancing carton for application thereto by the wipe down arms B and C.

While the leading end of the gummed tape 331 is being applied by the wipe down arms B and C to the advancing end and the top of the transported carton 134 as it progressively travels forward along the retracted lever arm 211, the extension 1290 of the latter is freed from behind the carton trailing end, so that this lever arm is permitted to swing counterclockwise as viewed in FIG. 8 under the influence of spring 207 to cause the four-way valve 204 to reverse the flow connections therethrough and establish the pneumatic circuitry shown in full lines in FIG. 9. As a result, pressurized air flowing through conduit 226, valve connection 226–1 and conduit 227 is supplied to motor cylinder 205 in front of its piston 231 to thrust the latter and its piston rod 231–1 forward and manipulate the nip roll 304 relative to the driven nip roll 322 and the guillotine knife 305 relative to the bed blade 325 from the positions illustrated in FIG. 10 to the positions illustrated in FIG. 11. Consequently, the bell crank 303, the arm 314 and the yoke 318 are swung counterclockwise, thereby retracting nip roll 304 and pulling the guillotine blade 309 forward to sever a length of the leading end of the tape 331, so as to permit the trailing end of the detached leading length of the latter to be applied down over the trailing end of the advancing carton 134. This action manipulates the tape driving and tape severing mechanisms from the FIG. 10 positions to the FIG. 11 positions for a repeat operation with the next oncoming carton.

As the advancing carton 134 passed along the side of the retracted lever arm 211 with glide of the opposed carton side against the edge of its extension 1290 the back end corner of the moving carton (such as that indicated at 3134 in FIG. 7) ultimately arrives at the edge junction point or corner 154 to permit the angularly related terminal edge section 155 to ride against the forwardly moving back end corner of the carton for gradual release of the lever arm 211 to permit it gradually to swing slowly clockwise under the influence of the tension of the spring 207 (FIG. 8). This action is similar to that described above in connection with the FIG. 7 illustration. Consequently, there is no sudden drop of the manipulating arm extension 1290 behind the back end of the forwardly moving carton to permit a "valve chatter" operation of the four-way valve 204 that could repeatedly reverse the pneumatic circuitry connections of FIG. 9 back and forth to cause the nip rolls to engage and disengage the gummed tape rapidly for undesirable jerky drive thereof and to effect a rapid forward and backward partial swing of the guillotine knife assembly 309 that may damage the tape.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a package handling machine the combination with conveyor means to transport a plurality of package units successively in spaced relation along a predetermined path past equipment located adjacent to this path to perform certain operations on each package unit with the transport path having an equipment control station located to one side thereof, each of the package units having a sidewall to be transported past this station in opposed relation and a trailing end wall arranged transversely of this sidewall and joined to the latter in a substantially sharp corner, of (a) control means mounted at said station to dictate successive operation of equipment on each package unit, and (b) a control means-manipulating arm movably mounted to said control means and having an outside edge opposed to said sidewall of each package unit when the latter is at said station, (c) said outside edge having an intermediate section and a forwardly-extending terminal section meeting at a junction point with said terminal edge section arranged obliquely to said intermediate edge section and extending forward from the latter progressively farther back away from said path so that at least the junction point of said edge sections contacts each such package unit sidewall located at said station with said terminal edge section diverging away from said sidewall for progressive wipe against each said package unit corner as the latter is transported forward past said edge junction point.

2. The package handling machine of claim 1 in which said intermediate edge section of said control means-manipulating arm lies in a plane with the opposed sidewalls of the successive package units being flat, said arm being so oriented with respect to the path of the opposed flat sidewalls of the successive package units as to cause said arm intermediate edge section to contact each of the latter substantially throughout its extent up to the edge junction point.

3. The package handling machine of claim 1 in which means are provided that bias said arm to an outward initial position, said control means and arm being so located relative to the path of forward travel of the opposed sidewall of an oncoming package unit and said arm intermediate edge section being so oriented in this initial outwardly biased position of said arm with respect to the leading end of such oncoming carton sidewall as to cross obliquely in a forward direction the path of forward travel to be followed by the latter for engagement by the forwardly traveling sidewall leading end and wiped progressively back thereover to effect gradual retraction of said arm until the edge junction point of said arm bears against the opposed carton sidewall.

4. The package handling machine of claim 1 in which said control means-manipulating arm is elongated and constitutes a lever having its intermediate edge section laid out substantially along a straight line and its oblique terminal edge section arranged at an oblique outside angle in the range of about 25°–50°.

No references cited.

TRAVIS S. McGEHEE, *Primary Examiner.*